US009481825B2

(12) United States Patent
Xu et al.

(10) Patent No.: US 9,481,825 B2
(45) Date of Patent: Nov. 1, 2016

(54) ELECTROCHROMIC MATERIAL, METHOD FOR PREPARING THE SAME AND COMPONENT COMPRISING THE SAME

(71) Applicants: BOE TECHNOLOGY GROUP CO., LTD., Beijing (CN); UNIVERSITY OF SCIENCE AND TECHNOLOGY OF CHINA, Anhui (CN)

(72) Inventors: Chunye Xu, Beijing (CN); Xiaoming Chen, Beijing (CN)

(73) Assignees: BOE TECHNOLOGY GROUP CO., LTD., Beijing (CN); UNIVERSITY OF SCIENCE AND TECHNOLOGY OF CHINA, Hefei, Anhui (CN)

( * ) Notice: Subject to any disclaimer, the term of this patent is extended or adjusted under 35 U.S.C. 154(b) by 142 days.

(21) Appl. No.: 14/424,214
(22) PCT Filed: Apr. 30, 2014
(86) PCT No.: PCT/CN2014/076649
§ 371 (c)(1),
(2) Date: Feb. 26, 2015
(87) PCT Pub. No.: WO2015/043182
PCT Pub. Date: Apr. 2, 2015

(65) Prior Publication Data
US 2016/0046858 A1 Feb. 18, 2016

(30) Foreign Application Priority Data
Sep. 29, 2013 (CN) .......................... 2013 1 0455207

(51) Int. Cl.
C09K 9/02 (2006.01)
C03C 17/32 (2006.01)
C08F 228/06 (2006.01)
C08G 61/12 (2006.01)

(52) U.S. Cl.
CPC ................. *C09K 9/02* (2013.01); *C03C 17/32* (2013.01); *C08F 228/06* (2013.01); *C08G 61/126* (2013.01); *C03C 2204/00* (2013.01); *C03C 2217/70* (2013.01); *C03C 2218/112* (2013.01); *C08G 2261/1424* (2013.01); *C08G 2261/3223* (2013.01); *C08G 2261/43* (2013.01); *C08G 2261/54* (2013.01); *C09K 2211/1458* (2013.01)

(58) Field of Classification Search
CPC .............. C03C 17/32; C03C 2204/00; C03C 2217/70; C03C 2218/112; C08F 228/06; C08G 61/126; C08G 2261/1424; C08G 2261/3223; C08G 2261/43; C08G 2261/54; C09K 9/02; C09K 2211/1458
USPC .......................................... 526/256; 427/110
See application file for complete search history.

(56) References Cited

U.S. PATENT DOCUMENTS 5,151,224 A 9/1992 Madou et al.
5,300,575 A 4/1994 Jonas et al.
2002/0196518 A1 12/2002 Xu et al.

FOREIGN PATENT DOCUMENTS

| CN | 1688633 A | 10/2005 |
|---|---|---|
| CN | 101983356 A | 3/2011 |
| CN | 102443144 A | 5/2012 |
| CN | 102936245 A | 2/2013 |
| CN | 103524718 A | 1/2014 |

OTHER PUBLICATIONS

Dyer et al. (Orange and Red to Transmissive Electrochromic Polymers Based on Electron-Rich Dioxythiophenes. Macromolecules, 2010, 43 (10), pp. 4460-4467).*
International Search Report for International Application No. PCT/CN2014/076649.
Chen et al., "Synthesis and Characterization of Electrochromic Poly(3,4-dioctyloxythiophene)", Journal of Sichuan University (Engineering Science Edition), vol. 41, No. 2, Mar. 2009.
Ming et al., "Electrochromic Materials Based on Organic Thiophene Derivatives", Progress in Chemistry, vol. 21, No. 6, Jun. 2009.
Chinese Office Action dated Feb. 28, 2015 issued in corresponding Chinese Application No. 201310455207.3.
Subbiah et al., "Efficient Green Solar Cells via a Chemically Polymerizable Donor—Acceptor Heterocyclic Pentamer", ACS Applied Materials & Interfaces, vol. 1, No. 6, pp. 1154-1158, 2009.
Dyer et al., "Orange and Red to Transmissive Electrochromic Polymers Based on Electron-Rich Dioxythiophenes", Macromolecules, vol. 43, No. 10, pp. 4460-4467, 2010.

* cited by examiner

*Primary Examiner* — Ling Choi
*Assistant Examiner* — Chun-Cheng Wang
(74) *Attorney, Agent, or Firm* — Nath, Goldberg & Meyer; Joshua B. Goldberg (57) ABSTRACT

The present invention relates to a polythiophene electrochromic material, which is a copolymer of [3,4-bis(2-ethylhexyloxy)thiophene]-thiophene-[3,4-dimethoxy thiophene] represented by Formula I:

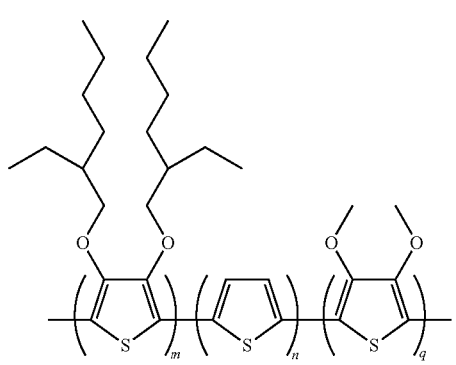

wherein, $0<n\leq0.5m$, $0<q<m$. The copolymer film has changeable colors reversibly varying between red and transparent, cycle life of more than 10,000. It has many advantages, such as low driving voltage, being transparent in the oxidation state with high transmittance, short response time, and being suitable for spray coating operation and the like, thus it has broad application prospect in the devices of electrochromic windows, electrochromic displays and the like.

13 Claims, 5 Drawing Sheets

ELECTROCHROMIC MATERIAL, METHOD FOR PREPARING THE SAME AND COMPONENT COMPRISING THE SAME

This is a National Phase Application filed under 35 U.S.C. 371 as a national stage of PCT/CN2014/076649, filed Apr. 30, 2014, an application claiming the benefit of Chinese Application No. 201310455207.3, filed Sep. 29, 2013, the content of each of which is hereby incorporated by reference in its entirety.

FIELD OF THE INVENTION

This invention relates to the field of electrochromic material, particularly relates to an electrochromic material, method for preparing the same, and a component comprising the same.

BACKGROUND OF THE INVENTION

Electrochromism is a special phenomenon displayed by some materials of reversibly changing color between a colored state at low transmittance and a bleached state at high transmittance when the materials undergo a redox reaction by injecting or extracting charge under a reversible high-low or positive-negative external electric field. Such phenomenon shows a reversible change of color and transparency in appearance, and has broad application prospect in the fields of electrochromic windows, electrochromic displays and the like. Electrochromic materials can be classified into inorganic electrochromic materials and organic electrochromic materials. A typical representative of the inorganic electrochromic materials is tungsten trioxide ($WO_3$). At present, the electrochromic device using $WO_3$ as functional material has been industrialized. Organic electrochromic materials mainly include polythiophenes and derivatives thereof, viologens, tetrathiafulvalene, metal phthalocyanines compounds and the like. The electrochromic device using the viologens as functional material has been put into practical use. Compared with the inorganic electrochromic materials represented by the transition metal oxide, organic electrochromic materials, such as polyaniline, polypyrrole, polythiophene, viologen and the like, have the advantages of having rich colors and easy molecular design, and thus are preferred by researchers.

The insolubility of the polythiophenes due to its rigid main chain presents difficulties in producing an electrochromic device from such electrochromic polymeric materials. Typically, the polymer is deposited directly onto the electrode surface to form a polymer film by electrochemical polymerization methods. However, the existed electrochemical polymerization method is not competent in forming electrochromic device having a large area. Accordingly, the present invention is particularly provided in view of this.

SUMMARY OF THE INVENTION

In the first aspect, the object of the present invention is to provide a novel polythiophene electrochromic material which has changeable of colors reversibly varying between red and transparency. Such a material has features of, for example, low driving voltage, high transmittance and transparency in oxidation state, short response time, suitable for spray coating operation and the like, and can be used for devices such as electrochromic windows, electrochromic displays and the like.

To achieve the above object, the present invention adopts the following technical solution:
a polythiophene electrochromic material of [3,4-bis(2-ethylhexyloxy)thiophene]-thiophene-[3,4-dimethoxy thiophene] copolymer represented by Formula I:

wherein, $0<n\leq0.5m$, $0<q<m$. Preferably, $0.4m<n\leq0.5m$, $0.4m<q<0.5m$.

More particularly, the polymers of the present invention have a number average molecular weight in the range of $3.0\times10^4$ g/mol to $5.5\times10^4$ g/mol, preferably in a range the $3.6\times10^4$ g/mol to $4.5\times10^4$ g/mol.

In the second aspect, the object of the present invention is to provide a method for preparing the above polymers, which is simple and has high yield so as to further increase the applicability of the polythiophene electrochromic material.

To achieve the above object, the present invention adopts the following technical solution:
a method for preparing the above polythiophene electrochromic material represented by Formula I, comprising:
Step 1: 3,4-dimethoxy thiophene reacting with 2-ethyl hexanol under the catalysis of a transetherification catalyst, to obtain 3,4-bis(2-ethylhexyloxy)thiophene; and
Step 2: 3,4-bis(2-ethylhexyloxy)thiophene, thiophene and 3,4-dimethoxy thiophene being subjected to an oxidation polymerization reaction under the oxidation of an oxidant, to obtain the [3,4-bis(2-ethylhexyloxy)thiophene]-thiophene-[3,4-dimethoxy thiophene] copolymer represented by Formula I.

In the above preparation method, the transetherification catalyst in Step 1 may be p-toluenesulfonic acid, p-amino benzenesulfonic acid, benzenesulfonic acid or anhydrous sodium bisulfate; preferably p-toluenesulfonic acid. The reaction solvent may be an organic solvent, such as benzene, toluene or xylene; preferably toluene.

The feeding molar ratio of 3,4-dimethoxy thiophene and 2-ethylhexanol is 1:4 to 1:6, preferably 1:5; and the feeding molar ratio of the catalyst and 3,4-dimethoxy thiophene is 1:10 to 1:15.

The reaction time of Step 1 is 24 to 48 hours and the reaction temperature is 110° C. to 130° C. Preferably, the reaction time is 32 to 40 hours, and the reaction temperature is 118° C. to 125° C.

Specifically, Step 1 may be carried out, for example, as follows: 3,4-dimethoxy thiophene, 2-ethyl hexanol, p-toluenesulfonic acid (pTSA) and toluene are added into a flask equipped with Soxhlet extractor, wherein the feeding molar ratio of 3,4-dimethoxy thiophene and 2-ethylhexanol is 1:4 to 1:6, and the feeding molar ratio of the catalyst and 3,4-dimethoxy thiophene is 1:10 to 1:15; the resultant mixture is then heated to 110-130° C. and refluxed for 24 to 48 hours, and then the mixture is cooled to room temperature followed by washing with water for several times, drying with anhydrous sodium sulfate and removing the solvent by rotary evaporation, so as to obtain a crude product; the crude product is purified by column chromatography to give an oily liquid, i.e. 3,4-bis(2-ethylhexyloxy)thiophene.

In the above preparation method, the oxidant in Step 2 may be the trivalent ferric oxidant, such as $Fe(ClO_4)_3$, $FeCl_3$, $Fe_2(SO_4)_3$; preferably anhydrous ferric chloride. The reaction solvent is selected from ethyl acetate, chloroform or nitromethane.

In Step 2, the molar amounts of 3,4-bis(2-ethylhexyloxy) thiophene, thiophene and 3,4-dimethoxy thiophene are represented respectively by m, n and q which satisfies the following relationship: $0<n\leq0.5m$, $0<q<m$, and the amount of the oxidant of anhydrous ferric chloride is 5 to 6 times of the total amount of the three monomers of 3,4-bis(2-ethylhexyloxy)thiophene, thiophene and 3,4-dimethoxy thiophene.

The reaction time of Step 2 is 24 to 72 hours, and the reaction temperature thereof is 10° C. to 35° C. Preferably, the reaction time is 48 to 72 hours, and the reaction temperature is 20° C. to 25° C.

Specifically, Step 2 may be carried out, for example, as follows: anhydrous $FeCl_3$ dissolved in 30 ml ethyl acetate is added into a flask and stirred; 3,4-bis(2-ethylhexyloxy) thiophene, thiophene, and 3,4-dimethoxy thiophene are mixed and dissolved in ethyl acetate, and the obtained solution is added gradually into the flask using a constant-pressure dropping funnel. The molar amounts of 3,4-bis(2-ethylhexyloxy)thiophene, thiophene and 3,4-dimethoxy thiophene represented respectively by m, n and q satisfy the following relationship: $0<n\leq0.5m$, $0<q<m$. The amount of the oxidant of anhydrous ferric chloride is 5 to 6 times of the total amount of the three kinds of monomers of thiophenes. After the addition is completed, the reaction mixture is stirred at 10° C. to 35° C. for 24 to 72 hours, and then it is added dropwise into methanol for precipitation, followed by suction filtration and washing with methanol until the filtrate becomes colorless; the filter cake is collected and dissolved in chloroform under stirring; hydrazine hydrate is added into the chloroform solution of the filter cake and the solution turns dark red. The excess solvent is removed by rotary evaporation and the residue is dropped into methanol for precipitation; the filter cake obtained by suction filtration is dissolved in chloroform, then filtration is performed so as to remove the insoluble matter; the resultant filtrate is dropped into methanol for precipitation, the filter cake obtained by further filtration is collected and dried in vacuum to give a red product.

For a person skilled in the art, the copolymers having different values of m, n and p can be obtained by adjusting the amount ratios of each monomer, thus the present invention is not limited to the above described form.

More preferably, the specific synthetic route of the method according to the present invention is as follows:

In the third aspect, the object of the present invention is to provide the use of the polythiophene electrochromic material in the manufacture of electrochromic devices, wherein said electrochromic devices include but is not limited to smart windows, displays and the like.

In addition, the present invention further provides a component comprising the above-described polythiophene electrochromic material (i.e. copolymer of [3,4-bis(2-ethylhexyloxy)thiophene]-thiophene-[3,4-dimethoxy thiophene]).

Preferably, the component of the present invention is an electrochromic film which has many merits, such as changeable colors reversibly varying between red and transparent; low driving voltage; being transparent in the oxidation state with high transmittance; short response time; being suitable for spray coating operation; and the like. The redox potential of the polymer film is 0.7 V and 0.4 V respectively. The polymer in the colored state has a maximum absorption wavelength of 530 nm with a transmittance of 5.68% and a transmittance difference of 46.8%; and the polymer in the bleached state has a maximum transmittance of 61.8%. The coloring time and bleaching time was 1.5 s and 1.3 s respectively.

The electrochromic film of the present invention can be prepared by using any of the film formation methods disclosed in the prior art. The preferred film formation method of the present invention comprising:

preparing the methylene chloride solution of the polymer, spraying the polymer solution on the surface of a indium tin oxide (ITO) glass or fluorine-doped SnO$_2$ (FTO) glass by a spray coating apparatus (including but not limited to an art airbrush connected to a air compressor) to form the electrochromic film, wherein the concentration of the polymer in the methylene chloride solution is 2 to 5 mg/ml.

Based on the above-described technical solutions, the present invention provides a novel electrochromic polymer material and a method for preparing the same. The polymer material may be sprayed in the form of a solution onto the surface of an ITO glass or an FTO glass to form a film; moreover, it has been found in practice that the polymer material has many merits, such as low driving voltage, short response time, large transmittance difference between the colored state and the bleached state, cycle life of more than 10,000, which is very suitable for smart windows, electrochromic displays and the like.

DETAILED DESCRIPTION OF THE INVENTION

The present invention provides a polythiophene electrochromic material which is a copolymer of [3,4-bis(2-ethylhexyloxy)thiophene]-thiophene-[3,4-dimethoxy thiophene] represented by Formula I:

wherein, 0<n≤0.5m, 0<q<m. Preferably, 0.4m<n≤0.5m, 0.4m<q<0.5m.

More particularly, the copolymers of the present invention have a number average molecular weight in the range of 3.0×10$^4$ g/mol to 5.5×10$^4$ g/mol, further preferably 3.6×10$^4$ g/mol to 4.5×10$^4$ g/mol.

The m, n, q in said range of ratio (preferably, in the defined range of the molecular weight of the polymer) can ensure that the resultant polymer has the merits of low driving voltage, being transparent in the oxidation state with high transmittance, short response time, and being suitable for spray coating operation.

The present invention also provides a method for preparing the polythiophene electrochromic material, comprising:

Step 1: 3,4-dimethoxy thiophene reacting with 2-ethyl hexanol under the catalysis of the transetherification catalyst, to obtain 3,4-bis(2-ethylhexyloxy)thiophene; and Step 2: 3,4-bis(2-ethylhexyloxy)thiophene, thiophene and 3,4-dimethoxy thiophene being subjected to an oxidation polymerization reaction under the oxidation of an oxidant, to obtain the copolymer of [3,4-bis(2-ethylhexyloxy)thiophene]-thiophene-[3,4-dimethoxy thiophene] represented by Formula I.

Preferably, in the above preparation method, the transetherification catalyst in Step 1 is p-toluenesulfonic acid, and the reaction solvent is toluene. The specific selection of the catalyst and solvent can produce an effective catalysis in the transetherification.

In step 1, the feeding molar ratio of 3,4-dimethoxy thiophene and 2-ethylhexanol is 1:4 to 1:6, preferably 1:5; and the feeding molar ratio of the catalyst and 3,4-dimethoxy thiophene is 1:10 to 1:15. The above-described feeding ratios are obtained on the basis of a great deal of experiments by the inventors. The feeding ratios should be optimally controlled as possible provided that the synthesis yield can be ensured.

The reaction time of Step 1 is 24 to 48 hours and the reaction temperature is 110° C. to 130° C. Preferably, the reaction time is 32 to 40 hours, and the reaction temperature is 118° C. to 125° C. Under such reaction conditions, the transetherification can be carried out more completely.

Specifically, Step 1 may be carried out, for example, as follows: 3,4-dimethoxy thiophene, 2-ethyl hexanol, p-toluenesulfonic acid (pTSA) and toluene are added into a flask equipped with Soxhlet extractor, wherein the feeding molar ratio of 3,4-dimethoxy thiophene and 2-ethylhexanol is 1:4 to 1:6, and the feeding molar ratio of the catalyst and 3,4-dimethoxy thiophene is 1:10 to 1:15; then the resultant mixture is heated to 110-130° C. and refluxed for 24 to 48 hours, and then the mixture is cooled to room temperature followed by washing with water for several times, drying with anhydrous sodium sulfate, and removing the solvent by rotary evaporation, so as to obtain a crude product; the crude product is purified by column chromatography to give an oily liquid, i.e. 3,4-bis(2-ethylhexyloxy)thiophene.

Preferably, the oxidant in Step 2 may be anhydrous ferric chloride. The reaction solvent is selected from ethyl acetate, chloroform or nitromethane. Anhydrous ferric chloride has oxidability, which can better facilitate the oxidation polymerization of the same monomers and the copolymerization of the different monomers in the above-described specific solvents.

In Step 2, the molar amounts of 3,4-bis(2-ethylhexyloxy) thiophene, thiophene and 3,4-dimethoxy thiophene are represented respectively by m, n and q which satisfies the following relationship: $0<n\leq 0.5m$, $0<q<m$, and preferably $0.4\ m<q<0.5\ m$. The amount of the oxidant of anhydrous ferric chloride is 5 to 6 times of the total amount of the three monomers of 3,4-bis(2-ethylhexyloxy)thiophene, thiophene and 3,4-dimethoxy thiophene. Such molar ratios of the monomers can ensure that the resultant polymer has the merits of low driving voltage, being transparent in the oxidation state with high transmittance, short response time, and being suitable for spray coating.

The reaction time of Step 2 is 24 to 72 hours, and the reaction temperature thereof is 10° C. to 35° C. Preferably, the reaction time is 48 to 72 hours, and the reaction temperature is 20° C. to 25° C. Such reaction conditions are mild, which can ensure the transetherification more completely.

Specifically, Step 2 may be carried out, for example, as follows: Anhydrous $FeCl_3$ dissolved in 30 ml ethyl acetate is added to a flask and stirred; 3,4-bis(2-ethylhexyloxy)thiophene, thiophene, and 3,4-dimethoxy thiophene are mixed and dissolved in ethyl acetate and the obtained solution is added gradually into the flask using a constant-pressure dropping funnel. The molar amounts of 3,4-bis(2-ethylhexyloxy)thiophene, thiophene and 3,4-dimethoxy thiophene represented respectively by m, n and q satisfy the following relationship: $0<n\leq 0.5m$, $0<q<m$. The amount of the oxidant of anhydrous ferric chloride is 5 to 6 times of the total amount of the three kinds of monomers of thiophenes. After the addition is completed, the reaction mixture is stirred at 10° C. to 35° C. for 24 to 72 hours, and then it is added dropwise into methanol for precipitation, followed by suction filtration and washing with methanol until the filtrate becomes colorless; the filter cake is collected and dissolved in chloroform under stirring; hydrazine hydrate is added into the chloroform solution of the filter cake and the solution turns dark red. The excess solvent is removed by rotary evaporation and the residue is dropped into methanol for precipitation; the filter cake obtained by suction filtration is dissolved in chloroform, then filtration is performed so as to remove the insoluble matter; the resultant filtrate is dropped into methanol for precipitation, the filter cake obtained by further filtration was collected and dried in vacuum to give a red product (i.e. the target polymer).

Preferably, the component comprising the aforesaid polythiophene electrochromic material (i.e. the copolymer of [3,4-bis(2-ethylhexyloxy)thiophene]-thiophene-[3,4-dimethoxy thiophene]) according to the present invention is an electrochromic film, which may be prepared by common technical means in the prior art, preferably by spray coating. The electrochromic film has changeable colors reversibly varying between red and transparent, and has many merits, such as changeable colors between red and transparent; low driving voltage; being transparent in the oxidation state with high transmittance; short response time; being suitable for spray coating operation. The redox potential of the polymer film is 0.7 V and 0.4 V respectively. The polymer in the colored state has a maximum absorption wavelength of 530 nm with a transmittance of 5.68% and a transmittance difference of 46.8%; and the polymer in the bleached state has a maximum transmittance of 61.8%. The coloring time and bleaching time was 1.5 s and 1.3 s respectively.

Hereinafter, the present invention will be described in further detail with reference to the following specific examples:

Example 1

Polythiophene Electrochromic Material

The polythiophene electrochromic material represented by formula I, which is a terpolymer of 3,4-bis(2-ethylhexyloxy)thiophene, thiophene and 3,4-dimethoxy thiophene (n=0.5 m, q=0.5 m), was prepared according to the aforesaid synthetic routes as follows:

(1) 3,4-dimethoxy thiophene (5 g, 35 mmol), 2-ethyl hexanol (18.23 g, 140 mmol), p-toluenesulfonic acid (0.65 g, 3.5 mmol) and 350 ml of toluene were added into a flask equipped with Soxhlet extractor; the mixture was heated to 120° C. and refluxed for 48 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 65% yield;

(2) Anhydrous $FeCl_3$ (11.44 g, 70.56 mmol) dissolved in 25 ml ethyl acetate were added to a flask and stirred; 3,4-bis(2-ethylhexyloxy)thiophene (2 g, 5.88 mmol), thiophene (0.247 g, 2.94 mmol), and 3,4-dimethoxy thiophene (0.424 g, 2.94 mmol) were dissolved in ethyl acetate and then added gradually into the flask using a constant-pressure dropping funnel. After the addition was completed, the reaction mixture was stirred at 25° C. for 48 hours, and then it was added dropwise into methanol for precipitation, followed by suction filtration and washing with methanol until the filtrate became colorless; the filter cake was collected and dissolved in chloroform under stirring; 2 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 35% yield.

Figure 1:
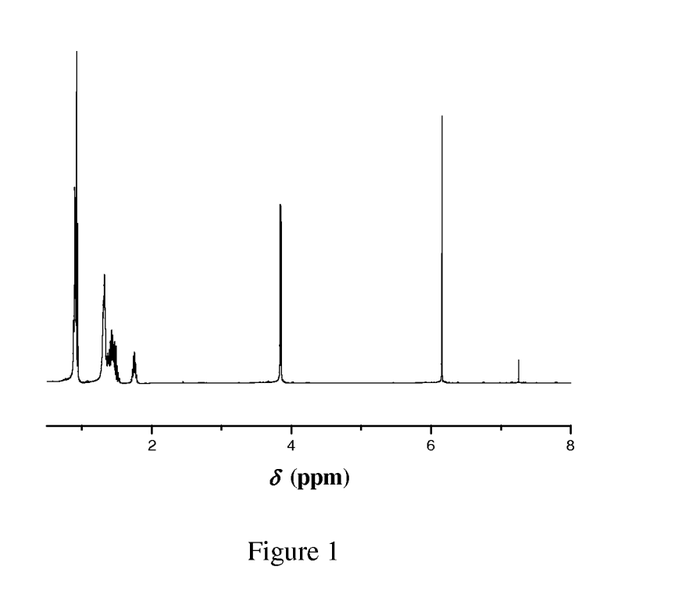
FIG. 1 is the $^1$H NMR Spectrum of the compound II.
Figure 2:
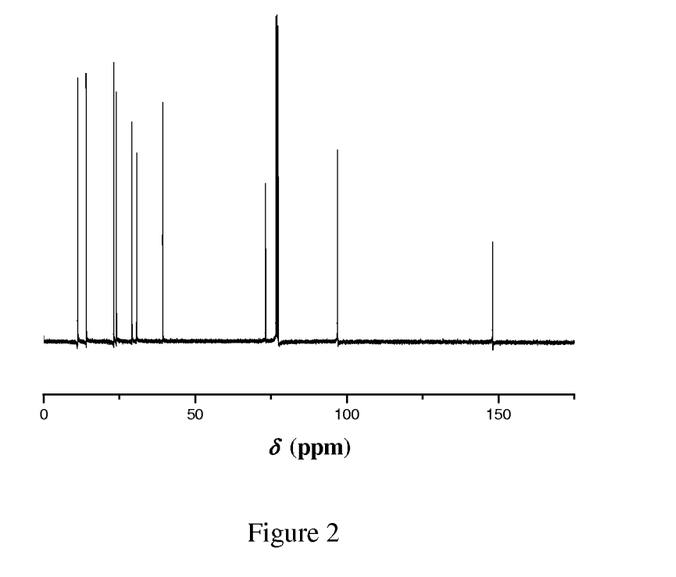
FIG. 2 is the C NMR Spectrum of compound II.

The $^1H$ NMR spectrum of Compound II is shown in FIG. 1, wherein the ordinate represents the peak intensity and the abscissa represents the chemical shift. The peak of $\delta=6.16$ corresponds to the hydrogen atoms of the 2- and 5-carbon atoms on thiophene ring, and the peak of $\delta=3.85, 3.84, 1.75, 1.32$ and $0.90$ correspond to the hydrogen atoms of 2-ethylhexyl. The C NMR spectrum of Compound II is shown in FIG. 2, wherein the ordinate represents the peak intensity and the abscissa represents the chemical shift. The peak of $\delta=148$ corresponds to the carbon atoms on the 3- and 4-sites of the thiophene ring; the peak of $\delta=97$ corresponds to the carbon atoms on the 2- and 5-sites of the thiophene ring; and the peak of $\delta=11, 14, 23, 24, 29, 31, 39$ and $73$ correspond to the carbon atoms of 2-ethylhexyl. FIGS. 1 and 2 indicate the correct structure of Compound II.

Figure 3:
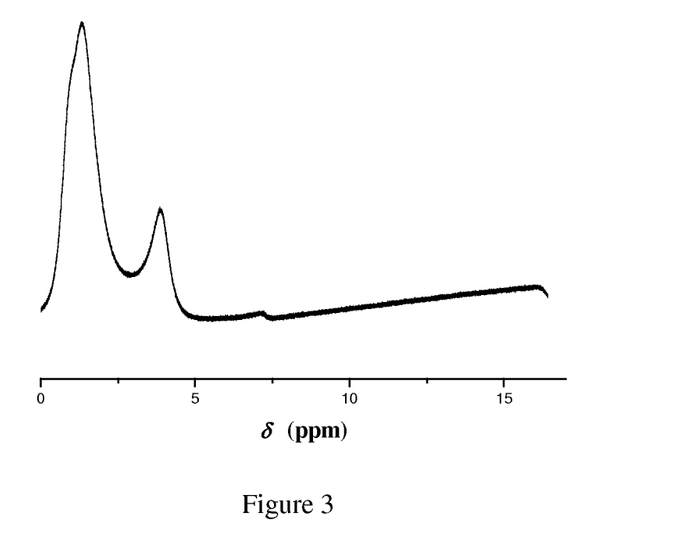
FIG. 3 is the $^1$H NMR Spectrum of an exemplary copolymer according to the present invention.

The $^1$H NMR spectrum (400 MHz, CDCl3) of the obtained copolymer represented by formula I is shown in FIG. 3, wherein the ordinate represents the peak intensity and the abscissa represents the chemical shift; the integral area ratio of the peaks $\delta_H$=7.00 (br, 1H), $\delta_H$=3.90 (br, 5H), and $\delta_H$=3.00-0.50 (br, 35H) is 1:5:35. The theory integral area ratio should be 1:5:32 based on the feeding ratio 1:0.5:0.5 of 3,4-bis(2-ethylhexyloxy)thiophene, thiophene and 3,4-dimethoxy thiophene. Therefore, FIG. 3 indicates the correct structure of the obtained copolymer.

Figure 4:
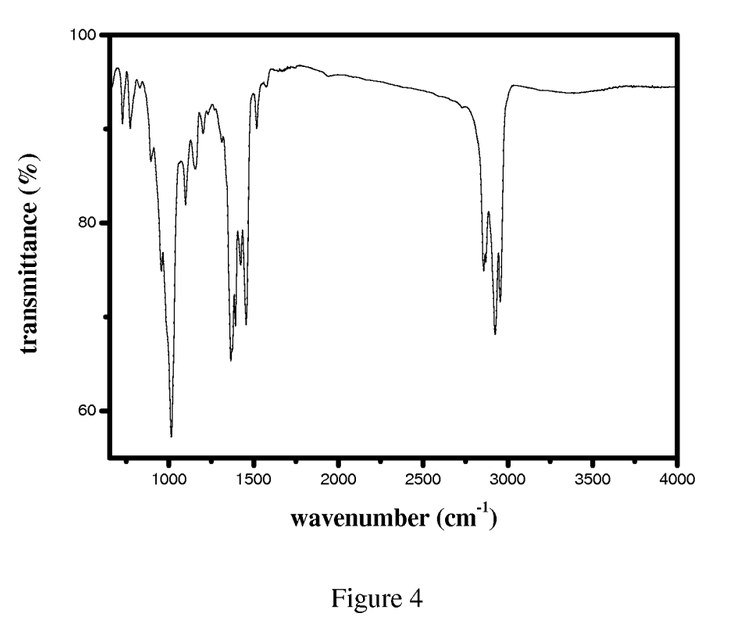
FIG. 4 is the Fourier Transform Infrared Spectrum of an exemplary copolymer according to the present invention.

The Fourier Transform Infrared spectrum of the obtained copolymer is shown in FIG. 4, wherein the ordinate represents the transmittance and the abscissa represents the wave number; the stretching vibration absorption peak of the C—S in thiophene is at 664 cm$^{-1}$; the out-of-plane bending vibration absorption peaks of the =C—H in thiophene are at 727 cm$^{-1}$ and 772 cm$^{-1}$; the stretching vibration absorption peak of the C—C is at 1014 cm$^{-1}$, the stretching vibration absorption peak of the C—O is at 1366 cm$^{-1}$; both the vibration adsorption peak of the C=C framework in thiophene and the symmetric bending vibration adsorption peak of the —CH2- are at 1456 cm$^{-1}$; the vibration adsorption peak of the C=C framework in thiophene is at 1519 cm$^{-1}$; the stretching vibration absorption peaks of the C—H of the alkyl chain are at 2858 cm$^{-1}$ and 2926 cm$^{-1}$; the stretching vibration absorption peaks of the C—H of the thiophene ring is at 2956 cm$^{-1}$. FIG. 4 indicates that the structure of the final product has no other functional groups except the designed functional groups.

The copolymer obtained in this example has an average molecular weight of 4.3×10$^4$ g/mol, which is measured by Gel Permeation Chromatography (GPC) using Agilent LC1200 liquid chromatograph under the following test conditions: tetrahydrofuran of HPLC-grade as the mobile phase, a flow rate of 1.0 ml/min, a sample concentration of 1 g/L, an injection volume of 20 microliters, a calibration curve generated by mono-dispersive polystyrene (similar hereinafter).

Example 2

Polythiophene Electrochromic Material

Polythiophene electrochromic materials were prepared in the same manner as in Example 1, with the exception that the mole ratios of the monomers were n=0.4 m, q=0.6 m; n=0.5 m, q=0.8 m; n=0.3 m, q=0.6 m; or n=0.5 m, q=0.45 m. The resultant copolymers have average molecular weights of 3.6×10$^4$ g/mol, 5.2×10$^4$ g/mol, 4.1×10$^4$ g/mol, and 4.5×10$^4$ g/mol respectively.

Example 3

Polythiophene Electrochromic Material

The steps of the preparation method according to this example were as follows:
(1) 3,4-dimethoxy thiophene (5 g, 35 mmol), 2-ethyl hexanol (18.23 g, 140 mmol), p-toluenesulfonic acid (0.65 g, 3.5 mmol) and 300 ml of toluene were added into a flask equipped with Soxhlet extractor; the mixture was heated to 120° C. and refluxed for 24 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 60% yield;
(2) Anhydrous FeCl$_3$ (11.44 g, 70.56 mmol) dissolved in 30 ml chloroform were added to a flask and stirred; 3,4-bis (2-ethylhexyloxy)thiophene (2 g, 5.88 mmol), thiophene (0.247 g, 2.94 mmol), and 3,4-dimethoxy thiophene (0.424 g, 2.94 mmol) were dissolved in chloroform and then added gradually into the flask using a constant-pressure dropping funnel. After the addition was completed, the reaction mixture was stirred at 20° C. for 24 hours, and then it was added dropwise into methanol for precipitation, followed by suction filtration and washing with methanol until the filtrate became colorless; the filter cake was collected and dissolved in chloroform under stirring; 2-4 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 20% yield.

The resultant copolymer has an average molecular weight of 4.1×10$^4$ g/mol.

Example 4

Polythiophene Electrochromic Material

The steps of the preparation method according to this example were as follows:
(1) 3,4-dimethoxy thiophene (5 g, 35 mmol), 2-ethyl hexanol (18.23 g, 140 mmol), p-toluenesulfonic acid (0.65 g, 3.5 mmol) and 250 ml of toluene were added into a flask equipped with Soxhlet extractor; the mixture was heated to 125° C. and refluxed for 48 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 70% yield;
(2) Anhydrous FeCl$_3$ (11.44 g, 70.56 mmol) dissolved in 20 ml ethyl acetate were added to a flask and stirred; 3,4-bis(2-ethylhexyloxy)thiophene (2 g, 5.88 mmol), thiophene (0.247 g, 2.94 mmol), and 3,4-dimethoxy thiophene (0.424 g, 2.94 mmol) were dissolved in ethyl acetate and then added gradually into the flask using a constant-pressure dropping funnel. After the addition was completed, the reaction mixture was stirred at 20° C. for 48 hours, and then it was added dropwise into methanol for precipitation, followed by suction filtration and washing with methanol until the filtrate became colorless; the filter cake was collected and dissolved in chloroform under stirring; 4 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 30% yield.

The resultant copolymer has an average molecular weight of $4.5 \times 10^4$ g/mol.

Example 5

Polythiophene Electrochromic Material

The steps of the preparation method according to this example were as follows:

(1) 3,4-dimethoxy thiophene (5 g, 35 mmol), 2-ethyl hexanol (18.23 g, 140 mmol), p-toluenesulfonic acid (0.65 g, 3.5 mmol) and 350 ml of toluene were added into a flask equipped with Soxhlet extractor; the mixture was heated to 115° C. and refluxed for 48 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 75% yield;

(2) Anhydrous $FeCl_3$ (11.44 g, 70.56 mmol) dissolved in 25 ml nitromethane were added to a flask and stirred; 3,4-bis(2-ethylhexyloxy)thiophene (2 g, 5.88 mmol), thiophene (0.247 g, 2.94 mmol), and 3,4-dimethoxy thiophene (0.424 g, 2.94 mmol) were dissolved in nitromethane and then added gradually into the flask using a constant-pressure dropping funnel. After the addition was completed, the reaction mixture was stirred at 20° C. for 48 hours, and then it was added dropwise into methanol for precipitation, followed by suction filtration and washing with methanol until the filtrate became colorless; the filter cake was collected and dissolved in chloroform under stirring; 2 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 25% yield.

The resultant copolymer has an average molecular weight of $4.7 \times 10^4$ g/mol.

Example 6

Polythiophene Electrochromic Material

The steps of the preparation method according to this example were as follows:

(1) 3,4-dimethoxy thiophene (5 g, 35 mmol), 2-ethyl hexanol (18.23 g, 140 mmol), p-toluenesulfonic acid (0.65 g, 3.5 mmol) and 300 ml of toluene were added into a flask equipped with Soxhlet extractor; the mixture was heated to 120° C. and refluxed for 48 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 65% yield;

(2) Anhydrous $FeCl_3$ (11.44 g, 70.56 mmol) dissolved in 35 ml ethyl acetate were added to a flask and stirred; 3,4-bis(2-ethylhexyloxy)thiophene (2 g, 5.88 mmol), thiophene (0.247 g, 2.94 mmol), and 3,4-dimethoxy thiophene (0.424 g, 2.94 mmol) were dissolved in ethyl acetate and then added gradually into the flask using a constant-pressure dropping funnel. After the addition was completed, the reaction mixture was stirred at 20° C. for 72 hours, and then it was added dropwise into methanol for precipitation, followed by suction filtration and washing with methanol until the filtrate became colorless; the filter cake was collected and dissolved in chloroform under stirring; 4 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 35% yield.

The resultant copolymer has an average molecular weight of $4.3 \times 10^4$ g/mol.

Example 7

Polythiophene Electrochromic Material

The steps of the preparation method according to this example were as follows:

(1) 3,4-dimethoxy thiophene (5 g, 35 mmol), 2-ethyl hexanol (18.23 g, 140 mmol), p-toluenesulfonic acid (0.65 g, 3.5 mmol) and 250 ml of toluene were added into a flask equipped with Soxhlet extractor; the mixture was heated to 120° C. and refluxed for 48 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 60% yield;

(2) Anhydrous $FeCl_3$ (11.44 g, 70.56 mmol) dissolved in 20 ml ethyl acetate were added to a flask and stirred; 3,4-bis(2-ethylhexyloxy)thiophene (2 g, 5.88 mmol), thiophene (0.247 g, 2.94 mmol), and 3,4-dimethoxy thiophene (0.424 g, 2.94 mmol) were dissolved in ethyl acetate and then added gradually into the flask using a constant-pressure dropping funnel. After the addition was completed, the reaction mixture was stirred at 30° C. for 48 hours, and then it was added dropwise into methanol for precipitation, followed by suction filtration and washing with methanol until the filtrate became colorless; the filter cake was collected and dissolved in chloroform under stirring; 3 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 30% yield.

The resultant copolymer has an average molecular weight of $4.8 \times 10^4$ g/mol.

Example 8

Polythiophene Electrochromic Material

The steps of the preparation method according to this example were as follows:

(1) 3,4-dimethoxy thiophene (5 g, 35 mmol), 2-ethyl hexanol (22.79 g, 175 mmol), p-toluenesulfonic acid (0.65 g, 3.5 mmol) and 350 ml of toluene were added into a flask equipped with Soxhlet extractor; the mixture was heated to 110° C. and refluxed for 48 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 55% yield;

(2) Anhydrous $FeCl_3$ (9.53 g, 70.56 mmol) dissolved in 25 ml nitromethane were added to a flask and stirred; 3,4-bis(2-ethylhexyloxy)thiophene (2 g, 5.88 mmol), thiophene (0.099 g, 1.18 mmol), and 3,4-dimethoxy thiophene (0.678 g, 4.70 mmol) were dissolved in nitromethane and then added gradually into the flask using a constant-pressure dropping funnel. After the addition was completed, the reaction mixture was stirred at 10° C. for 72 hours, and then it was added dropwise into methanol for precipitation, followed by suction filtration and washing with methanol until the filtrate became colorless; the filter cake was collected and dissolved in chloroform under stirring; 2 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 25% yield.

The resultant copolymer has an average molecular weight of $4.0 \times 10^4$ g/mol.

Example 9

Polythiophene Electrochromic Material

The steps of the preparation method according to this example were as follows:

(1) 3,4-dimethoxy thiophene (5 g, 35 mmol), 2-ethyl hexanol (27.35 g, 210 mmol), p-toluenesulfonic acid (0.52 g, 2.9 mmol) and 300 ml of toluene were added into a flask equipped with Soxhlet extractor; the mixture was heated to 130° C. and refluxed for 24 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 50% yield;

(2) Anhydrous $FeCl_3$ (10.23 g, 70.56 mmol) dissolved in 35 ml ethyl acetate were added to a flask and stirred; 3,4-bis(2-ethylhexyloxy)thiophene (2 g, 5.88 mmol), thiophene (0.247 g, 2.94 mmol), and 3,4-dimethoxy thiophene (0.382 g, 2.65 mmol) were dissolved in ethyl acetate and then added gradually into the flask using a constant-pressure dropping funnel. After the addition was completed, the reaction mixture was stirred at 35° C. for 24 hours, and then it was added dropwise into methanol for precipitation, followed by suction filtration and washing with methanol until the filtrate became colorless; the filter cake was collected and dissolved in chloroform under stirring; 4 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, and the filter cake obtained by further filtration was collected and dried in vacuum to give a red product (i.e. Polymer I), 30% yield.

The resultant copolymer has an average molecular weight of $4.4 \times 10^4$ g/mol.

Example 10

Polythiophene Electrochromic Material

The steps of the preparation method according to this example were as follows:

(1) 3,4-dimethoxy thiophene (5 g, 35 mmol), 2-ethyl hexanol (27.35 g, 210 mmol), p-toluenesulfonic acid (0.43 g, 2.3 mmol) and 250 ml of toluene were added into a flask equipped with Soxhlet extractor; the mixture was heated to 118° C. and refluxed for 40 hours, and then the mixture was cooled to room temperature followed by washing with water for several times, drying with anhydrous sodium sulfate, and removing the solvent using a rotary evaporator, so as to obtain a crude product which was purified by column chromatography to give an oily liquid, i.e. 3,4-bis(2-ethylhexyloxy)thiophene (Compound II), 50% yield;

(2) Anhydrous $FeCl_3$ (10.87 g, 70.56 mmol) dissolved in 20 ml ethyl acetate were added to a flask and stirred; 3,4-bis(2-ethylhexyloxy)thiophene (2 g, 5.88 mmol), thiophene (0.197 g, 2.35 mmol), and 3,4-dimethoxy thiophene (0.424 g, 2.94 mmol) were dissolved in ethyl acetate and then added gradually into the flask using a constant-pressure dropping funnel. After the addition was completed, the reaction mixture was stirred at 25° C. for 48 hours, and then it was added dropwise into methanol for precipitation, followed by suction filtration and washing with methanol until the filtrate became colorless; the filter cake was collected and dissolved in chloroform under stirring; 3 ml of hydrazine hydrate was added into the chloroform solution of the filter cake and the solution turned dark red. The excess solvent was removed by rotary evaporation and the residue was dropped into methanol for precipitation; the filter cake obtained by suction filtration was dissolved in chloroform, then filtration was performed so as to remove the insoluble matter; the remaining filtrate was dropped into methanol for precipitation, the filter cake obtained by further filtration was collected and dried in vacuum to give a red product (i.e. Polymer I), 30% yield.

The resultant copolymer has an average molecular weight of $4.9 \times 10^4$ g/mol.

Example 11

Components Comprising Polythiophene Electrochromic Material (Electrochromic Films)

The dichloromethane solutions of the copolymers obtained from Examples 1-9 (5 mg/ml) were prepared and sprayed respectively onto the surfaces of ITO glasses using a art airbrush connected to an air compressor (ZheJiang Jonway Electrical Manufacturing Co., Ltd) at a operating voltage of 220 V, a theoretical flow of 89 L/min and a exhaust pressure of 0.8 MPa to form electrochromic films.

Example 12

Components Comprising Polythiophene Electrochromic Material (Electrochromic Films)

The dichloromethane solutions of the copolymers obtained from Examples 1-9 (2 mg/ml) were prepared and sprayed respectively onto the surfaces of ITO glasses by a art airbrush connected to an air compressor (ZheJiang Jonway Electrical Manufacturing Co., Ltd) at a operating voltage of 220 V, a theoretical flow of 89 L/min and a exhaust pressure of 0.8 MPa to form electrochromic films.

The electrochromic film comprising the copolymer obtained in Example 6 was selected for performance tests, and the results were recorded as below.

Figure 5:
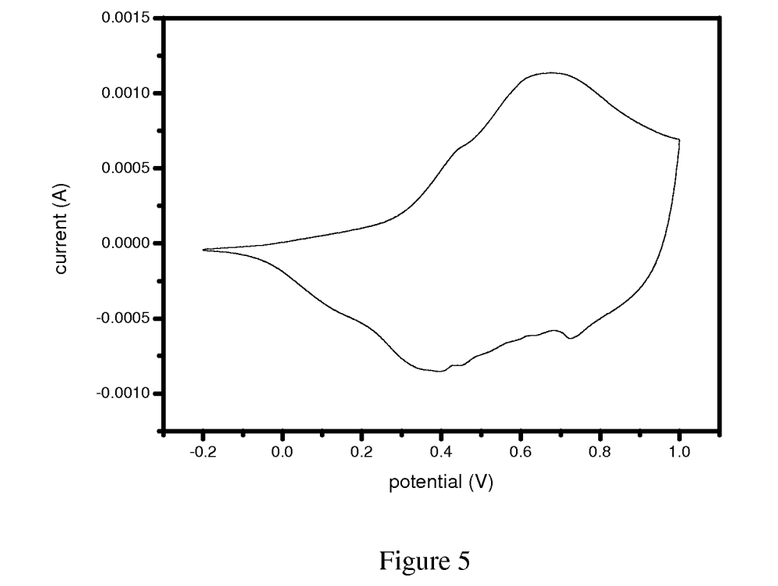
FIG. 5 is the cyclic voltammogram of a film formed by an exemplary copolymer according to the present invention.

The transmittance of the obtained copolymer film was measured by V-670 type UV-visible-near infrared spectrophotometer (Jasco Corporation, Tokyo, Japan) with a wavelength scanning range of 200 to 1000 nm. The transmittance of the copolymer film of this example in colored state and bleached state are schematically shown in FIG. 5, wherein the ordinate represents the transmittance and the abscissa represents the wavelength. The red dotted line curve represents the transmittance of the copolymer film in colored state, wherein the maximum absorption wavelength in colored state is at 530 nm and the transmittance in this state is 5.68%; the transmittance difference is 46.8%. The black solid line curve represents the transmittance of the copolymer film in bleached state, wherein the maximum transmittance in bleached state is at 610.5 nm and the transmittance in this state is 61.8%.

Figure 6:
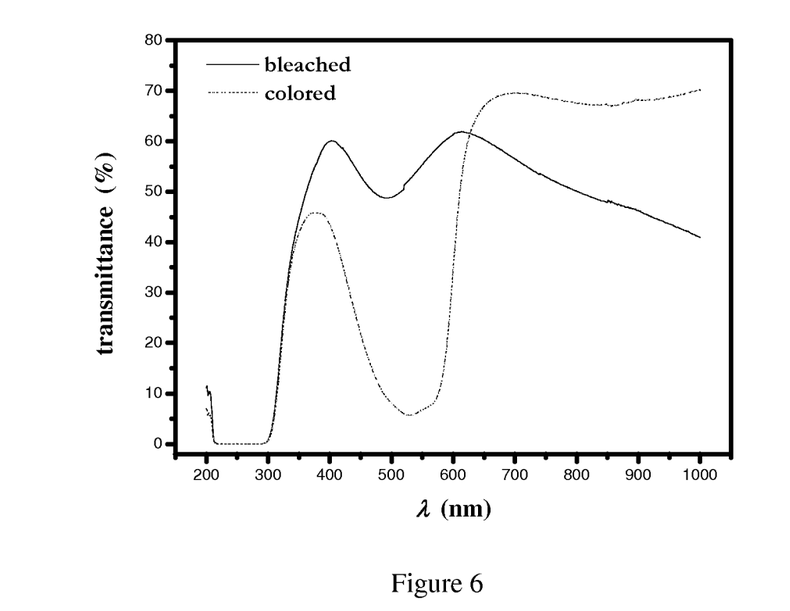
FIG. 6 is the schematic transmittance graph of a film formed by an exemplary copolymer according to the present invention in colored state and bleached state.

The difference between the colored state and the bleached state of the copolymer film in this example is schematically shown in FIG. 6, wherein the ordinate represents transmittance difference and the abscissa represents the wavelength; the curve is obtained by subtracting the transmittance in the colored state from that in the bleached state of the copolymer film at the same wavelength of light. This figure indicates that the maximum transmittance difference between the colored state and bleached state is at 568 nm, which reaches 49.8%; and the contrast ratio is 57.88:8.1 (i.e. 7.15:1).

The cyclic voltammetry curve, multiple potential step curves, and chronocoulometry curve during the coloring and bleaching of the obtained copolymer film were tested by CHI-650D electrochemical workstation (Shanghai ChenHua Instrument Co., Ltd.). Specifically, the cyclic voltammetry curve was tested under the following conditions: a scanning voltage range of −0.2 V to 1 V, the scanning speed of 0.1 V/s. The multiple potential step curves were tested under the following conditions: step voltage 1 of 1 V and voltage load time of 2 s; step voltage 2 of −0.2 V and voltage load time of 2 s. The chronocoulometry curve during bleaching was tested under the following conditions: load voltage of 1 V and pulse width of 2 s. The chronocoulometry curve during coloring was tested under the following conditions: load voltage of −0.2 V and pulse width of 2 s.

Figure 7:
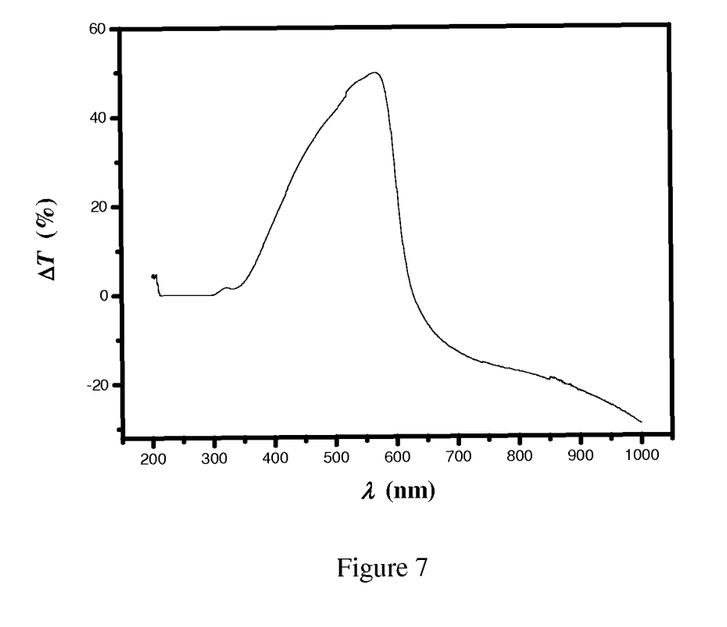
FIG. 7 is the schematic transmittance difference graph of a film formed by an exemplary copolymer according to the present invention in colored state and bleached state.

The cyclic voltammetry curve of the copolymer film of this example is shown in FIG. 7, wherein the ordinate represents the electric current and the abscissa represents the voltage. This figure indicates the redox potentials of the polymer were 0.7 V and 0.4 V respectively.

Figure 8:
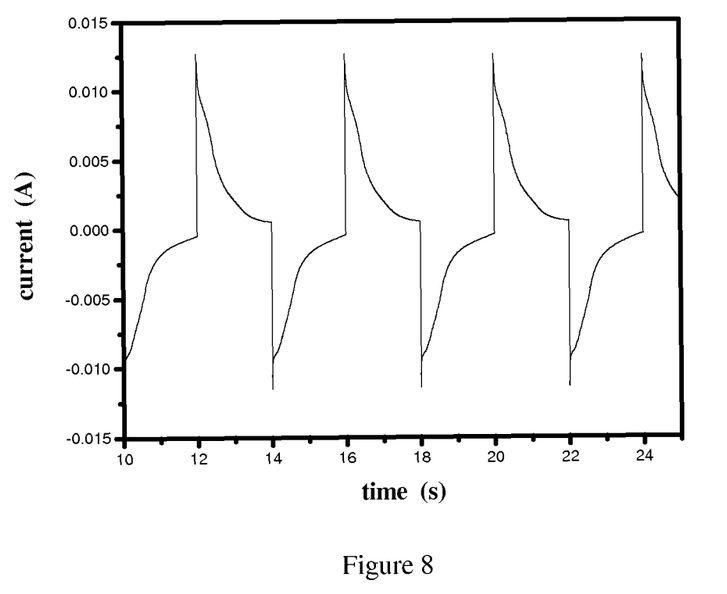
FIG. 8 is the multiple potential step graph of a film formed by an exemplary copolymer according to the present invention.

The multiple potential step curve of the copolymer film of this example is shown in FIG. 8, wherein the ordinate represents the electric current and the abscissa represents the time. If 95% of the time that the current changing from the maximum to zero was taken for the response time, the coloring and bleaching time were 1.5 s and 1.3 s respectively.

Figure 9:
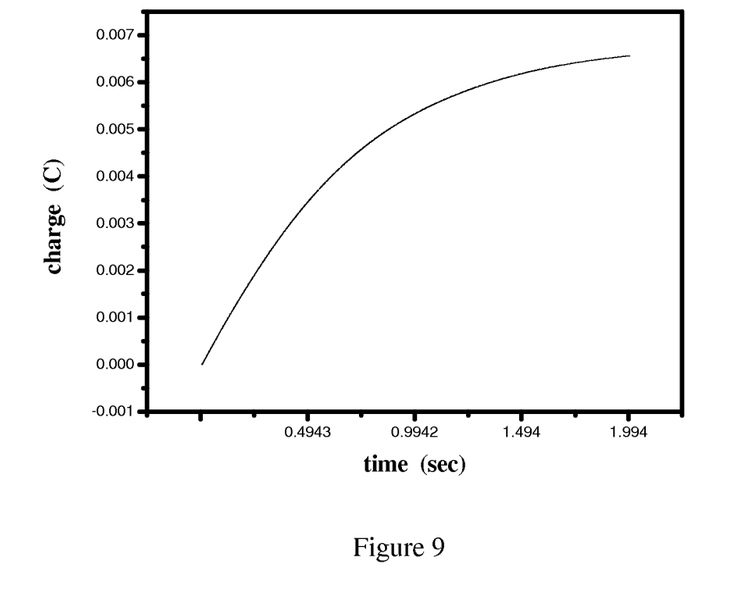
FIG. 9 and FIG. 10 are respectively the chronocoulometry graphs of a film formed by an exemplary copolymer according to the present invention in colored state and bleached state.
Figure 10:
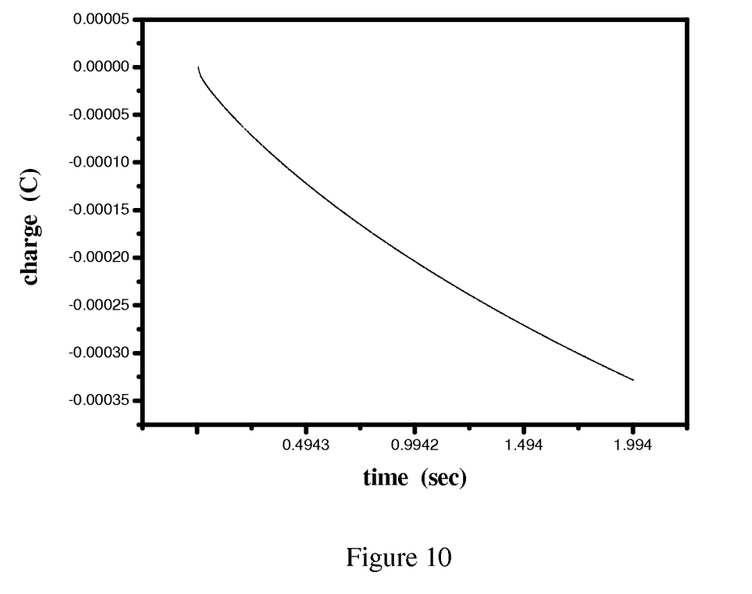

The chronocoulometry curve during coloring and bleaching of the copolymer film (area of 1.92 cm$^2$) of this example is shown in FIGS. 9 and 10, wherein the ordinate represents the quantity of electricity and the abscissa represents the time. This figure shows that the required charge density to drive the bleaching of the copolymer film is 0.00342 C/cm$^2$, that to drive the coloring is 0.0001713 C/cm$^2$.

It can be seen that, the electrochromic film formed by the aforesaid copolymer material has changeable colors reversibly varying between red and transparent, and has many merits, such as low driving voltage; being transparent in the oxidation state with high transmittance; short response time; being suitable for spray coating operation and the like.

It is understood that the present invention is not limited to the above-illustrated embodiments, which were chosen and described in order to best explain the principles of the invention. Those skilled in the art can make various modifications or variations without departing from the spirit and essence of the present invention. It is intended that the scope of the invention be defined by the following claims and their equivalents.

The invention claimed is:

1. A polythiophene electrochromic material, which is a copolymer of [3,4-bis(2-ethylhexyloxy)thiophene]thiophene-[3,4-dimethoxy thiophene] represented by Formula I:

I wherein, 0<n≤0.5m, 0<q<m.

2. The polythiophene electrochromic material according to claim 1, wherein 0.4m<n≤0.5m, 0.4m<q<0.5m.

3. The polythiophene electrochromic material according to claim 1, wherein the copolymer has a number average molecular weight in the range of $3.0 \times 10^4$ g/mol to $5.5 \times 10^4$ g/mol.

4. A method for preparing a polythiophene electrochromic material, wherein the polythiophene electrochromic material is a copolymer of [3,4-bis(2-ethylhexyloxy)thiophene]-thiophene-[3,4-dimethoxy thiophene] represented by Formula I:

wherein, $0<n\leq 0.5m$, $0<q<m$; and the method comprising:

Step 1: 3,4-dimethoxy thiophene reacting with 2-ethyl hexanol under the catalysis of the transetherification catalyst, to obtain 3,4-bis(2-ethylhexyloxy)thiophene; and Step 2: 3,4-bis(2-ethylhexyloxy)thiophene, thiophene and 3,4-dimethoxy thiophene being subjected to an oxidation polymerization reaction under the oxidation of an oxidant, to obtain the copolymer of [3,4-bis(2-ethylhexyloxy)thiophene]thiophene-[3,4-dimethoxy thiophene] represented by Formula I.

5. The method according to claim 4, wherein, in the Step 1, the catalyst for transetherification reaction is p-toluenesulfonic acid, and the reaction solvent is toluene.

6. The method according to claim 4, wherein the feeding molar ratio of 3,4-dimethoxy thiophene and 2-ethylhexanol is 1:4 to 1:6, and the feeding molar ratio of the catalyst and 3,4-dimethoxy thiophene is 1:10 to 1:15.

7. The method according to claim 4, wherein, in the Step 1, the reaction time is 24 to 48 hours, and the reaction temperature is 110° C. to 130° C.

8. The method according to claim 4, wherein, in the Step 2, the oxidant is anhydrous ferric chloride, and the reaction solvent is selected from ethyl acetate, chloroform or nitromethane.

9. The method according to claim 4, wherein, in the Step 2, the molar amounts of 3,4-bis(2-ethylhexyloxy)thiophene, thiophene and 3,4-dimethoxy thiophene are represented respectively by m, n and q which satisfies the following relationship: $0<n\leq 0.5m$, $0<q<m$, and the amount of the oxidant of anhydrous ferric chloride is 5 to 6 times of the total amount of the three monomers of 3,4-bis(2-ethylhexyloxy)thiophene, thiophene and 3,4-dimethoxy thiophene.

10. The method according to claim 4, wherein, in the Step 2, the reaction time is 24 to 72 hours, and the reaction temperature is 10° C. to 35° C.

11. A component, comprising a polythiophene electrochromic material which is a copolymer of [3,4-bis(2-ethylhexyloxy)thiophene]-thiophene-[3,4-dimethoxy thiophene] represented by Formula I:

wherein, $0<n\leq 0.5m$, $0<q<m$.

12. The component according to claim 11, wherein the component is an electrochromic film.

13. The component according to claim 12, wherein the electrochromic film is prepared by a method comprising:

preparing the dichloromethane solution the electrochromic material, and spraying the of the electrochromic material onto the surface of an ITO glass or a FTO glass with a spray coating apparatus.

* * * * *